(12) United States Patent
Lintonen et al.

(10) Patent No.: US 12,313,518 B2
(45) Date of Patent: May 27, 2025

(54) DEVICE FOR MEASURING THE QUALITY OF AIR

(71) Applicant: SAFERA OY, Espoo (FI)

(72) Inventors: Samuli Lintonen, Vantaa (FI); Mikko Halonen, Espoo (FI)

(73) Assignee: SAFERA OY, Espoo (FI)

( * ) Notice: Subject to any disclaimer, the term of this patent is extended or adjusted under 35 U.S.C. 154(b) by 285 days.

(21) Appl. No.: 17/640,103

(22) PCT Filed: Sep. 4, 2020

(86) PCT No.: PCT/FI2020/050570
§ 371 (c)(1),
(2) Date: Mar. 3, 2022

(87) PCT Pub. No.: WO2021/044080
PCT Pub. Date: Mar. 11, 2021

(65) Prior Publication Data
US 2022/0291110 A1  Sep. 15, 2022

(30) Foreign Application Priority Data

Sep. 6, 2019 (FI) ........................................ 20195735
Sep. 6, 2019 (FI) ........................................ 20195736
(Continued)

(51) Int. Cl.
*G01N 15/1434* (2024.01)
*G01N 15/00* (2024.01)
*G01N 15/14* (2024.01)

(52) U.S. Cl.
CPC ..... *G01N 15/1434* (2013.01); *G01N 15/1459* (2013.01); *G01N 2015/0046* (2013.01); *G01N 2015/1452* (2013.01)

(58) Field of Classification Search
CPC .......... G01N 2015/1486; G01N 21/53; G01N 15/075; G01N 15/1459; G01N 2015/0046;
(Continued)

(56) References Cited

U.S. PATENT DOCUMENTS 3,515,482 A    6/1970  Garrow et al.
4,226,533 A *  10/1980  Snowman ................ G01V 8/12
                                                    340/630
(Continued)

FOREIGN PATENT DOCUMENTS

CN    205 483 937 U    8/2016
EP       2562480 A1    2/2013
(Continued)

OTHER PUBLICATIONS

PCT International Search Report and Written Opinion of the International Searching Authority, WIPO Application No. PCT/FI2020/050570, mailed Dec. 7, 2020.
(Continued)

*Primary Examiner* — Sunghee Y Gray
(74) *Attorney, Agent, or Firm* — Alston & Bird LLP

(57) ABSTRACT

A device for measuring the particle content of air comprises a laser source for generating laser light and for directing it to a target area, an air channel for directing the air subjected to the measurement as an air flow through the target area, and a light detector located adjacent to the target area for detecting bursts of light generated as the particles entrained with the air flow scatter the laser light in the target area. The device comprises a light trap between the laser source and the target area for reducing stray light propagating to the target area. The light trap comprises at least two intermediate walls which are substantially transverse in relation to the propagation direction of the laser light, each of the inter- (Continued)

Figure 1:
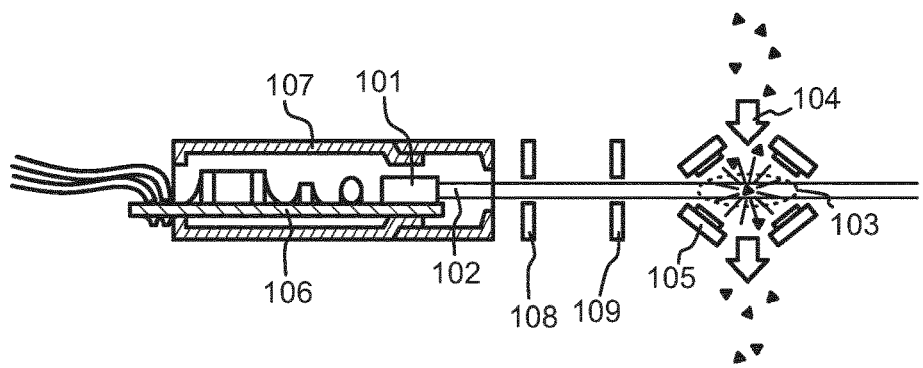

mediate walls having an aperture for passage of a desirably limited amount of the laser light through the given intermediate wall. The intermediate walls are part of a same piece manufactured as one continuous block.

19 Claims, 10 Drawing Sheets

(30) Foreign Application Priority Data

Sep. 6, 2019 (FI) ...................................... 20195738
Sep. 6, 2019 (FI) ...................................... 20195739

(58) Field of Classification Search
CPC ............... G01N 15/06; G01N 33/0009; G01N 15/0205; G01N 15/0211; G01N 15/0255; G01N 15/065; G01N 15/14; G01N 15/1404; G01N 15/1434; G01N 2001/2276; G01N 2015/0007; G01N 2015/0687; G01N 21/17; G01N 21/274; G01N 21/64; G01N 21/85; G01N 2201/0221; G01N 2201/0612; G01N 2201/062; G01N 2201/0642; G01N 2201/12746; G01N 25/18; G01N 27/128; G01N 27/16; G01N 33/497; G01N 5/02
USPC ........................................................ 356/338
See application file for complete search history.

(56) References Cited

U.S. PATENT DOCUMENTS

| | | |
|---|---|---|
| 7,088,447 B1 | 8/2006 | Bates et al. |
| 2004/0080747 A1 | 4/2004 | Cerni et al. |
| 2009/0009346 A1 | 1/2009 | Hojmose et al. |
| 2013/0326244 A1 | 12/2013 | Koyama et al. |
| 2014/0084165 A1 | 3/2014 | Fadell et al. |
| 2014/0134053 A1 | 5/2014 | Mayer et al. |
| 2014/0165554 A1* | 6/2014 | Luo ....................... B60T 11/232 60/533 |
| 2016/0334320 A1 | 11/2016 | Cho |
| 2017/0023458 A1 | 1/2017 | Hart et al. |
| 2017/0115196 A1 | 4/2017 | Tsuboi et al. |
| 2017/0248740 A1 | 8/2017 | Palumbo |
| 2018/0372622 A1 | 12/2018 | Erdtmann |
| 2019/0212060 A1 | 7/2019 | Lintonen et al. |

FOREIGN PATENT DOCUMENTS

| | | |
|---|---|---|
| EP | 2706516 A1 | 3/2014 |
| JP | S5767849 A | 4/1982 |
| JP | H0527654 U | 2/1993 |
| JP | H11248628 A | 9/1999 |
| JP | H11248629 A | 9/1999 |
| JP | 2000235000 A | 8/2000 |
| JP | 2003107001 A | 4/2009 |
| JP | 2009237692 A | 10/2009 |
| JP | 2016090350 A | 5/2016 |
| JP | 2016146094 A | 8/2016 |
| WO | WO 2015/151502 A1 | 10/2015 |
| WO | WO 2017/054098 A1 | 4/2017 |
| WO | WO 2018/032802 A1 | 2/2018 |
| WO | WO 2018/104153 A1 | 6/2018 |
| WO | WO 2018/107266 A1 | 6/2018 |
| WO | WO 2018/159899 A1 | 9/2018 |
| WO | WO 2018/222980 A1 | 12/2018 |

OTHER PUBLICATIONS

FI Application No. 20195735, Office Action and Search Report mailed Mar. 18, 2020.
FI Application No. 20195736, Office Action and Search Report mailed Apr. 3, 2020.
FI Application No. 20195738, Office Action and Search Report mailed Apr. 3, 2020.
FI Application No. 20195739, Office Action and Search Report mailed Apr. 3, 2020.
WIPO Application No. PCT/FI2020/050570, PCT International Search Report and Written Opinion of the International Searching Authority mailed Dec. 7, 2020.

* cited by examiner

DEVICE FOR MEASURING THE QUALITY OF AIR

CROSS-REFERENCE TO RELATED APPLICATIONS

The present application is a national phase entry of International Application No. PCT/FI2020/050570, filed Sep. 4, 2020, which claims priority to Finnish Application Nos. 20195735, 20195736, 20195738, and 20195739, each filed Sep. 6, 2019, which are incorporated herein by reference in their entireties.

FIELD OF THE INVENTION

The invention generally relates to devices for measuring air quality. Specifically, the invention relates to devices by means of which the particle content in air may be measured.

BACKGROUND OF THE INVENTION

Solid particles which have a maximum diameter of some micrometres and which are suspended in air are referred to as particulates. The term use involves some degree of variation, but according to one usage, particles with a diameter of less than 2.5 micrometres are particulates and particles of less than 10 micrometres are respirable particles. English-language sources employ the general terms suspended particulate matter (SPM), particulate matter (PM) or particulates, which are subdivided into coarse particles (diameter 2.5-10 micrometres), fine particles (diameter less than 2.5 micrometres), and ultrafine particles (diameter less than 0.1 micrometres).

In terms of the present invention, there is no need to set any strict limits on the size of the particles; therefore, this text generally discusses particles within the meaning of particles which are suspended in air and the content of which is to be measured at a given time. However, respirable particles, i.e. those having a diameter of less than about 10 micrometres, are typically the most relevant ones.

FIG. 1 illustrates a known principle of measuring the particle content of air. A laser diode 101 generates a laser beam 102 which is directed to a target area 103. An air flow 104 is directed through the target area 103, along which air flow the particles to be measured are entrained. The air flow may be produced for example by means of a blower. Around the target area 103 in one or more directions there are one or more light detectors 105. A particle entrained along the air flow 104 to the target area 103 and into the laser beam scatters laser light around itself. At least part of this laser light is detected as a burst of light by means of the light detectors 105. When the amount of the flowing air per time unit is known and the bursts of light detected within a specific time are counted, the particle content of air may be calculated.

The laser diode 101 may be mounted on a circuit board 106 which is provided with other components transmitting a required operating voltage to the laser diode 101. The circuit board may be located in a housing 107 which functions as a protection and support structure. Light traps may be used to limit the stray light produced when generating and directing the laser beam, which light traps are represented in FIG. 1 by intermediate walls 108 and 109.

In the arrangement of the prior art, problems arise particularly if it is to be constructed with a small size and battery operation capability and its manufacturing costs are to be kept at a reasonable level. One consequence of the small-size requirement is that it becomes more and more complicated to eliminate the stray light: the closer the light detector or detectors are to the light source, the more difficult it is to prevent propagation of the stray light. The requirement of keeping the costs at a low level has the same effect, as cheap lasers and cheap optics generally produce more stray light than expensive ones. The battery operation means, among other things, that a small amount of electric energy will be available, whereby it is more difficult to provide sufficient brightness of the light over the target area, and at the same time only a small amount of power is available for the electronics used for detecting the bursts of light. The blower motors by means of which the air flow has customarily been produced are also problematic in terms of sufficiency of the battery charge.

SUMMARY OF THE INVENTION

It is an object of the present invention to disclose a device for measuring the particle content of air, whereby the device is small in size and affordable in manufacturing costs and it consumes only little electricity. It is also an object of the invention that the device is easily integrable as a part into a larger unit in which other measuring devices may also be arranged, so that synergy between the parts of the unit will be achievable from the integration.

The objects of the invention are achieved by incorporating the features according to the accompanying independent claim in the device.

The device according to the invention comprises a laser source for generating laser light and for directing it to a target area, an air channel for directing the air subjected to the measurement as an air flow through the target area and a light detector located adjacent to the target area for detecting bursts of light generated as the particles entrained with the air flow scatter the laser light in the target area. The device comprises a light trap between the laser source and the target area for reducing stray light propagating to the target area. The light trap comprises at least two intermediate walls which are substantially transverse in relation to the propagation direction of the laser light, each of the intermediate walls having an aperture for passage of a desirably limited amount of the laser light through the given intermediate wall. The intermediate walls are part of a same piece manufactured as one continuous block, such that each of the apertures is delimited throughout the perimeter of the aperture by a continuous portion of the piece manufactured as one continuous block.

According to one embodiment said piece manufactured as one continuous block has been manufactured by injection-moulding. This is advantageous, as injection moulding is an affordable and sufficiently accurate manufacturing method for the manufacture of large batches.

According to one embodiment said at least two intermediate walls include a first intermediate wall and a second intermediate wall, which are located in this order from the laser source towards the target area. The aperture in the first intermediate wall is conical in a cross-section taken along the optical axis of the laser light, such that it is larger from the side of the laser source than from the side of the target area, and the aperture in the second intermediate wall is conical in a cross-section taken along the optical axis of the laser light, such that it is larger from the side of the target area than from the side of the laser source. This is advantageous, as the aperture design efficiently limits propagation of the stray light, and the apertures in the intermediate walls may be manufactured using suitable cores in the mould.

According to one embodiment said at least two intermediate walls further include a third intermediate wall which is arranged between the laser source and the first intermediate wall. The aperture in the third intermediate wall is conical in a cross-section taken along the optical axis of the laser light, such that it is larger from the side of the laser source than from the side of the target area. This is similarly advantageous as the corresponding design of the two other apertures.

According to one embodiment said piece manufactured as one continuous block forms a holder for the laser source for holding it in a pre-selected position in relation to the target area. This is advantageous, as the laser source can be mounted in a well-reproducible manner in all devices manufactured in this way, and no separate parts are required for holding it in place.

According to one embodiment, part of said piece manufactured as one continuous block forms a frame surrounding the active area of said light detector. This is advantageous, as the stray light tending to propagate to the light detector from the side may be efficiently limited.

According to one embodiment the distance from the laser source to the centre of the target area is 10-20 millimetres. This is advantageous, as the device can be manufactured with a relatively small size, whereby it is easily integrable for example into a stove guard or other measuring device.

According to one embodiment the active area of the light detector is elongated in a direction of the optical axis of the laser light, and the width of the active area in a direction perpendicular to the optical axis of the laser light is less than 4 millimetres, most preferably less than 2 millimetres. This is advantageous, as the device can be manufactured with a relatively small size, whereby it is easily integrable for example into a stove guard or other measuring device.

According to one embodiment the device comprises a circuit board to which the light trap and the light detector are fastened and to which other electronic components of the device are also fastened. Said piece manufactured as one continuous block comprises one or more open regions on its side arranged against the circuit board and one or more of said other electronic components are located on the circuit board such that they are arranged at said one or more open regions between the intermediate walls of the light trap. This is advantageous in keeping the size of the device small, as its parts and components may be packed in a relatively small space.

According to one embodiment the laser source comprises a laser diode and optics located in a common housing. The housing is mechanically supported to said piece manufactured as one continuous block. This is advantageous, as the laser source may be acquired as a subcontracted component and easily connected to the rest of the device with dimensional accuracy.

According to one embodiment said housing is shaped as a cylinder having a longitudinal axis, and said laser source is arranged to generate said laser light in such a way that the optical axis of the generated laser light coincides with the longitudinal axis of said cylinder. The housing is mechanically supported to a cylindrical recess provided as an extension of the light trap in a direction which is opposite in relation to the direction of the target area. This is advantageous, as the holder for the laser source may be manufactured with the same core which is also used for moulding at least part of the apertures in the intermediate walls.

Other preferred embodiments are presented in the following detailed description in which reference is made to the accompanying figures.

LIST OF FIGURES

Figure 2:
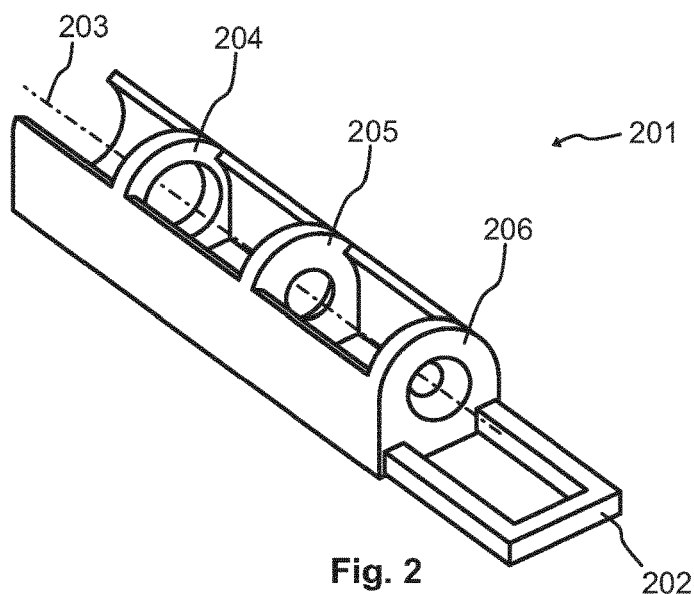
Figure 3:
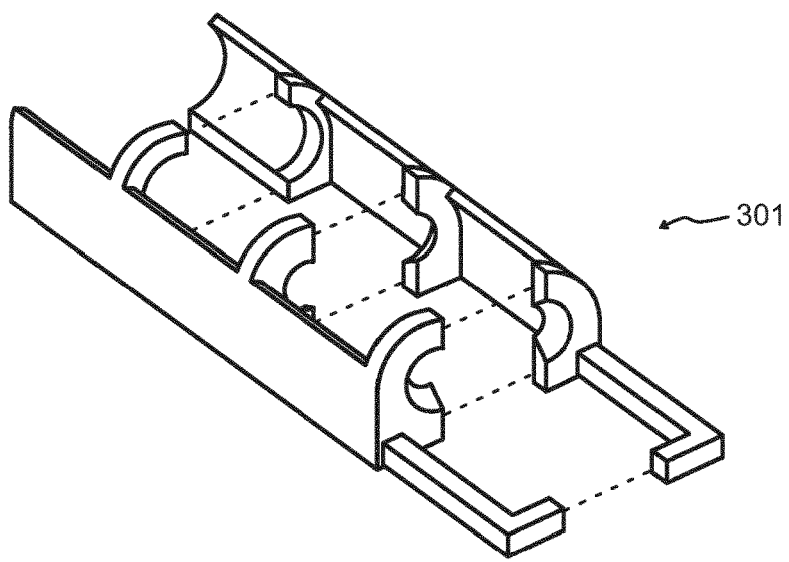
Figure 4:
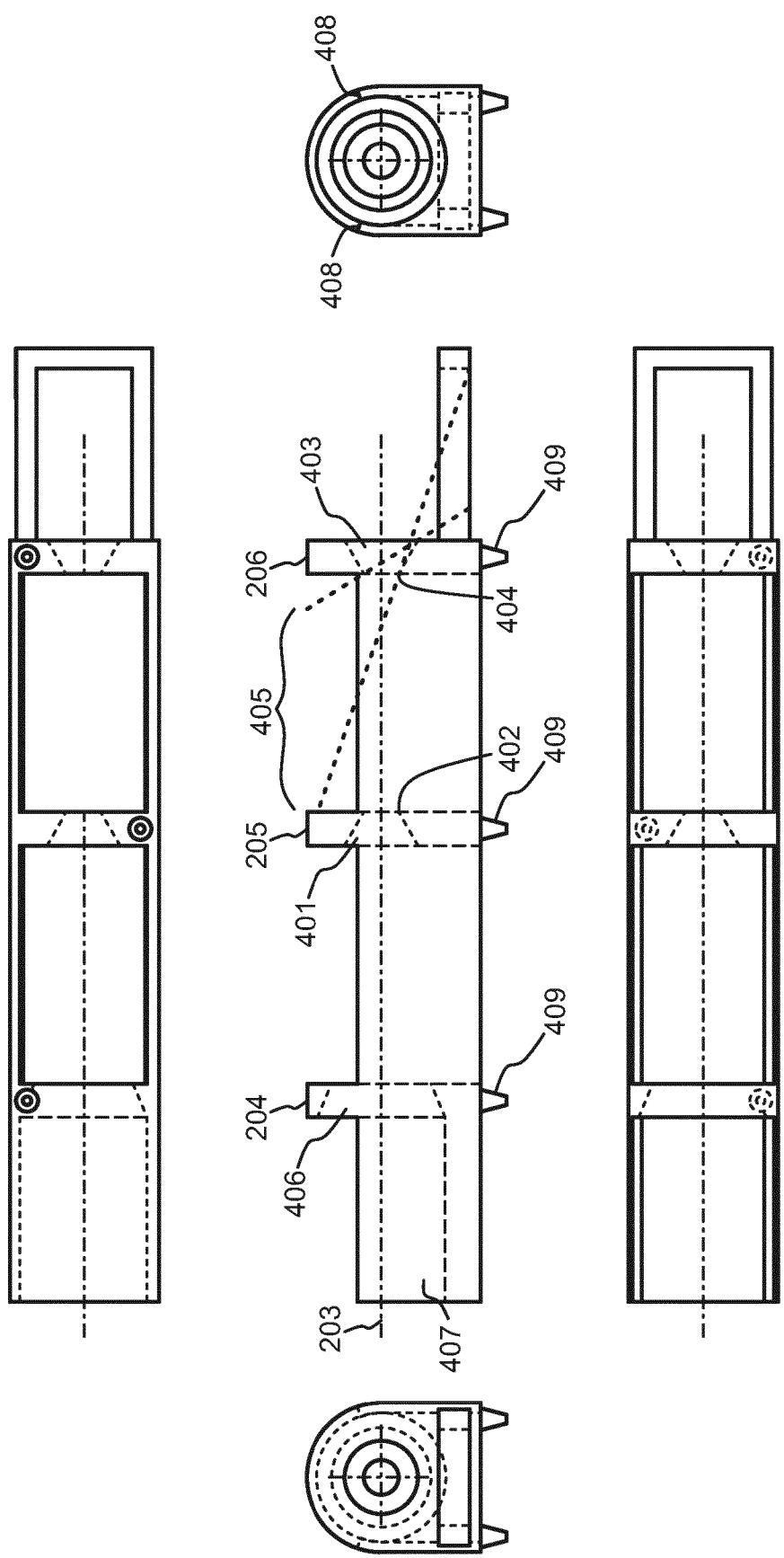
Figure 6:
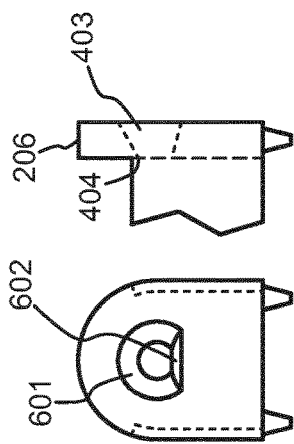
Figure 5:
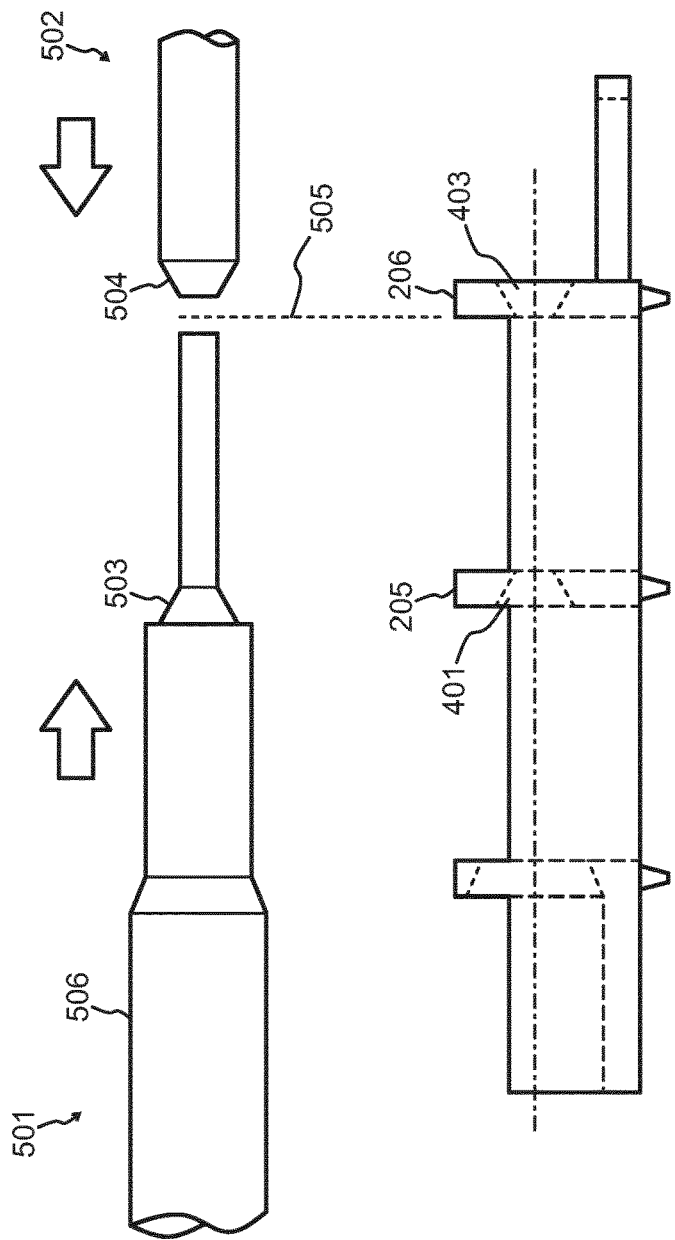
Figure 7:
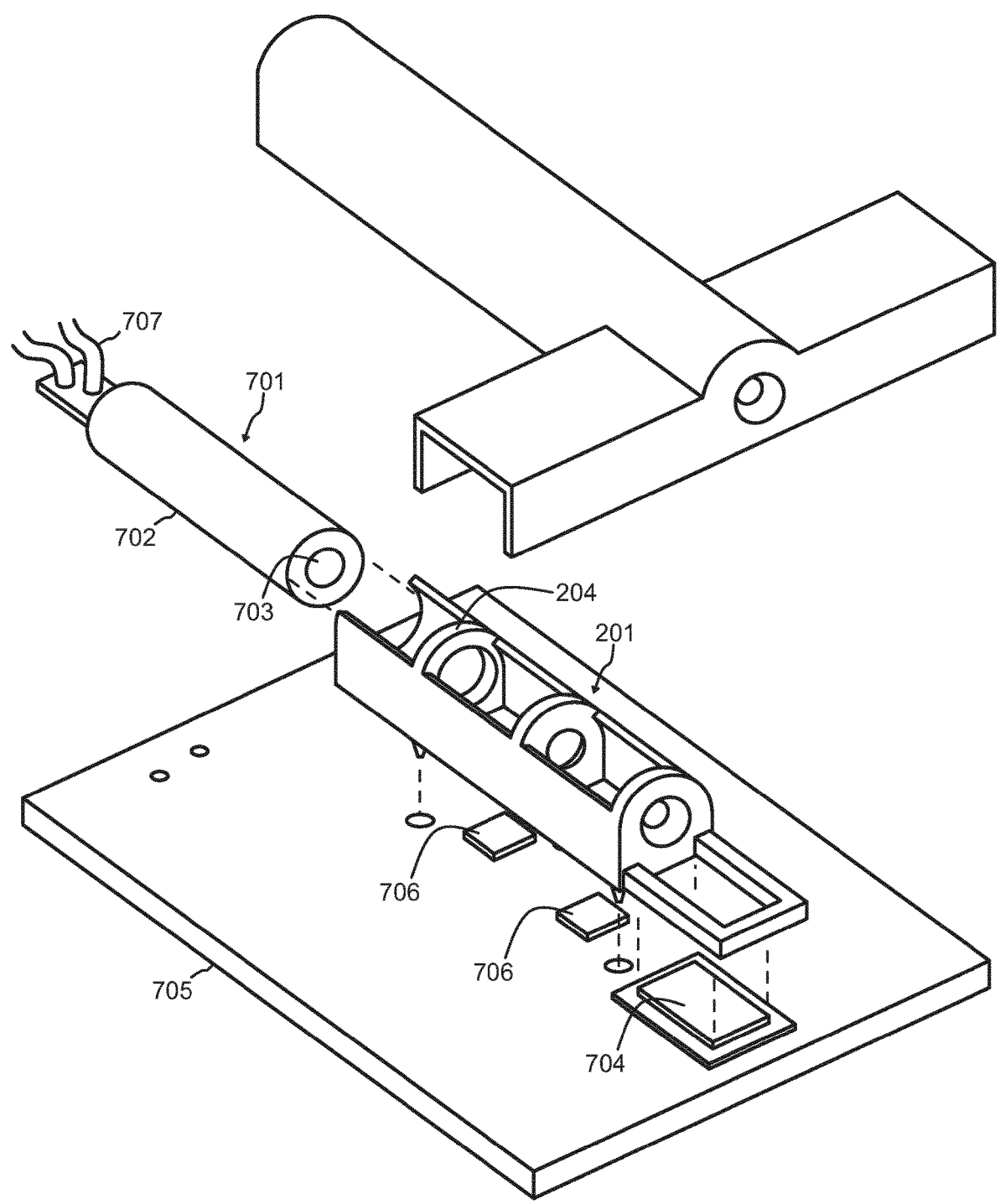
Figure 8:
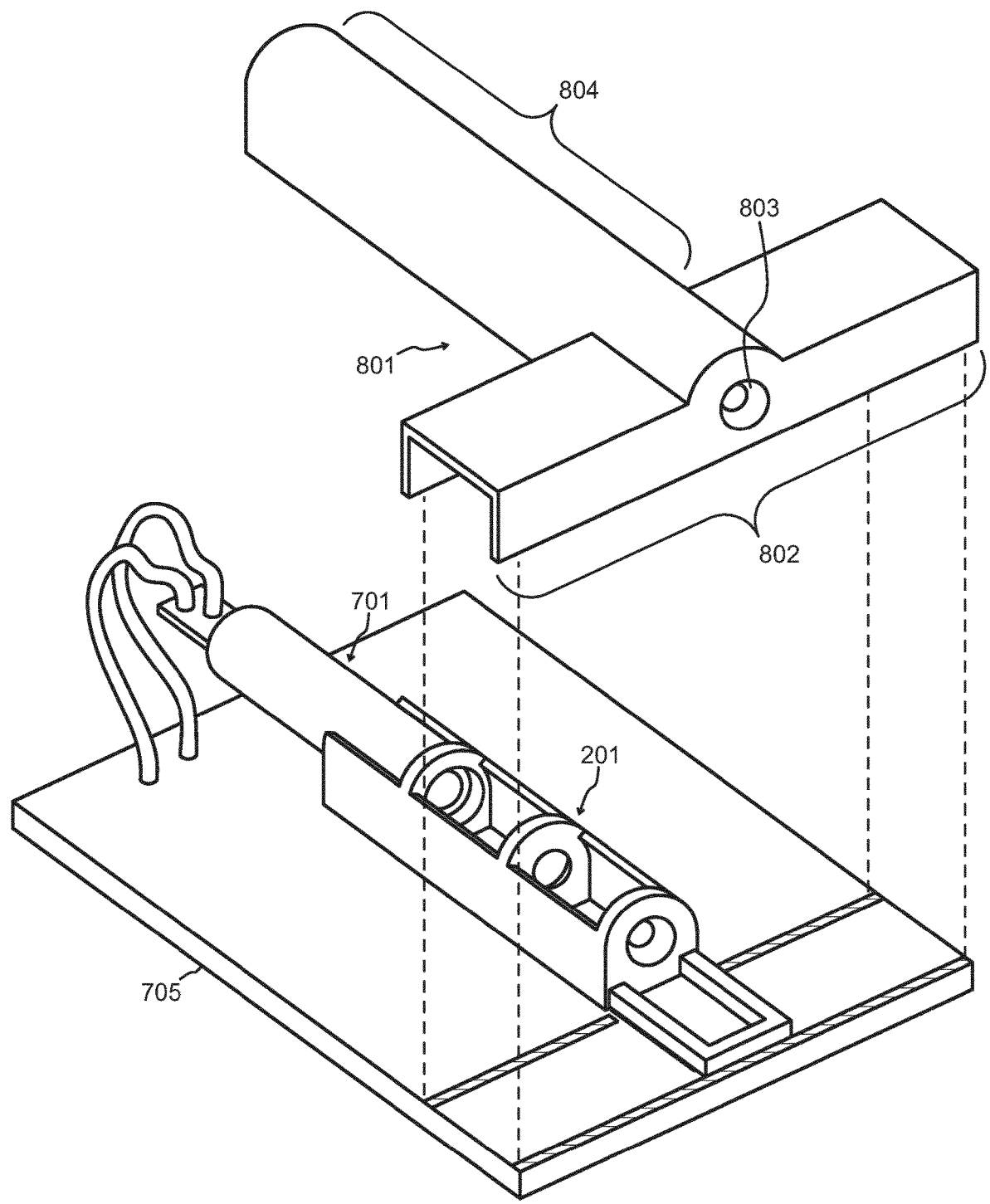
Figure 9:
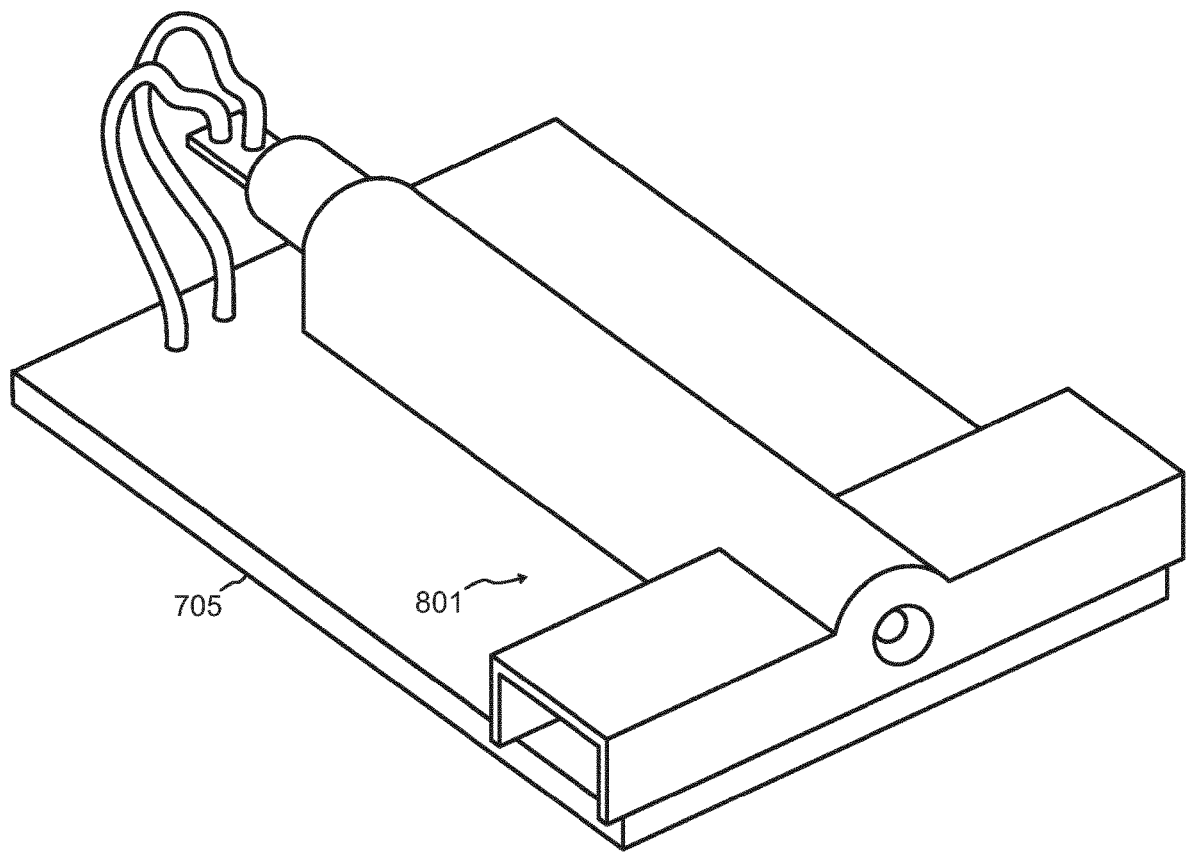
Figure 10:
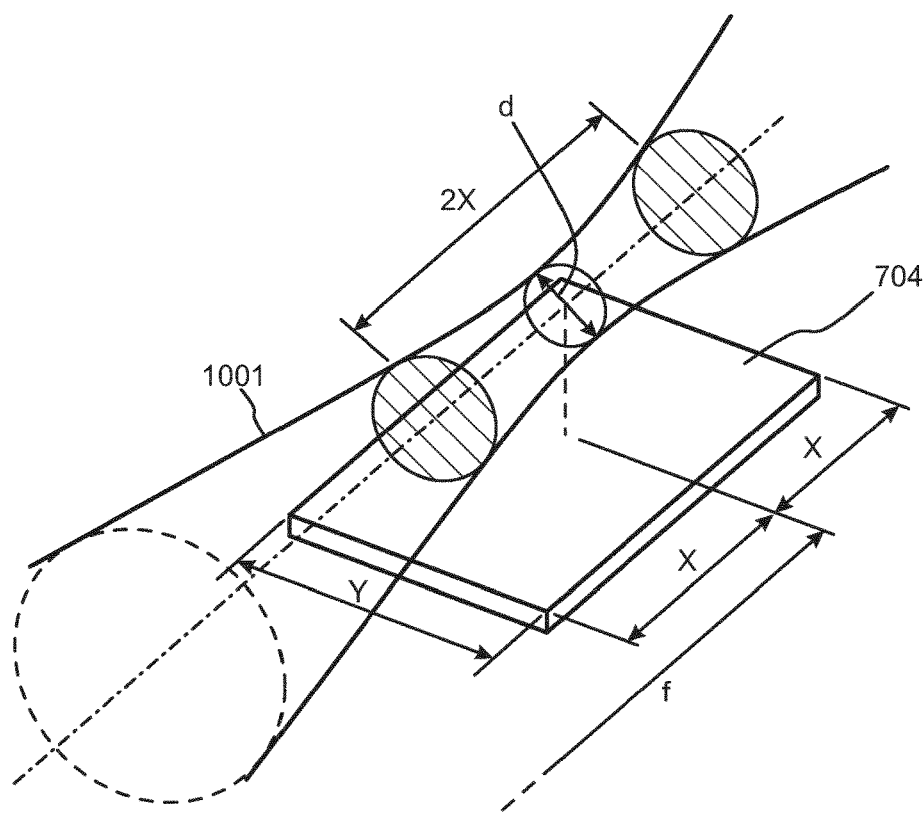
Figure 11:
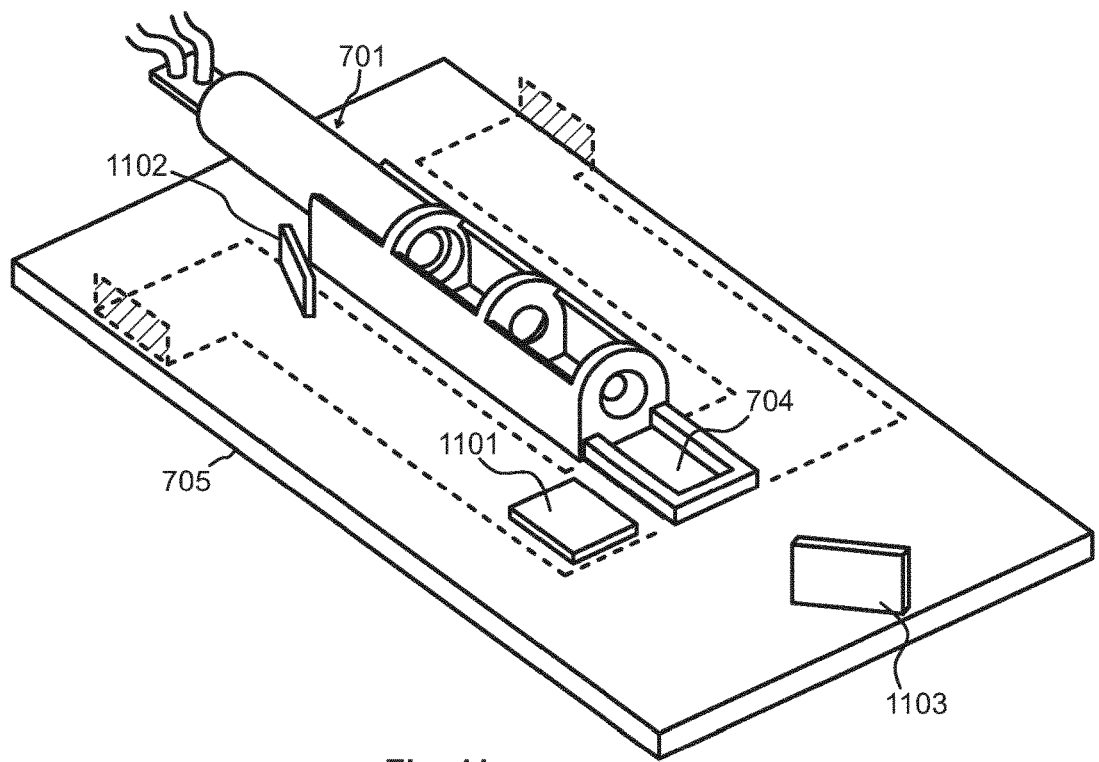
Figure 12:
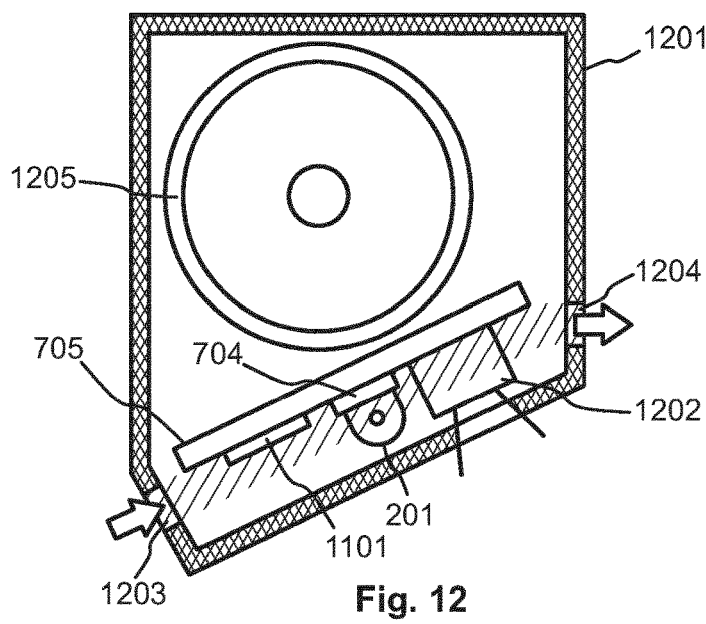
Figure 13:
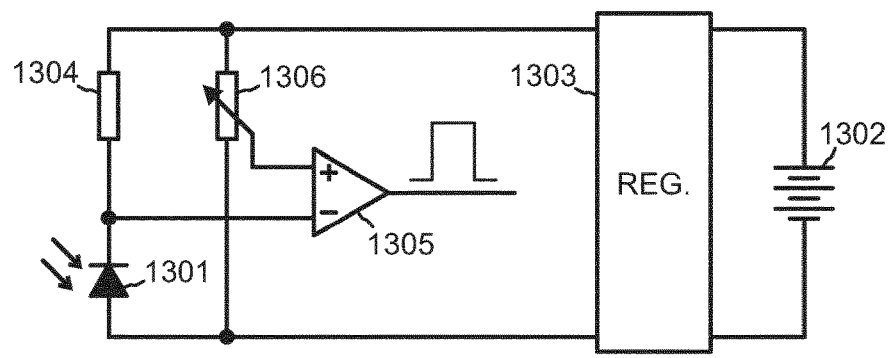
Figure 14:
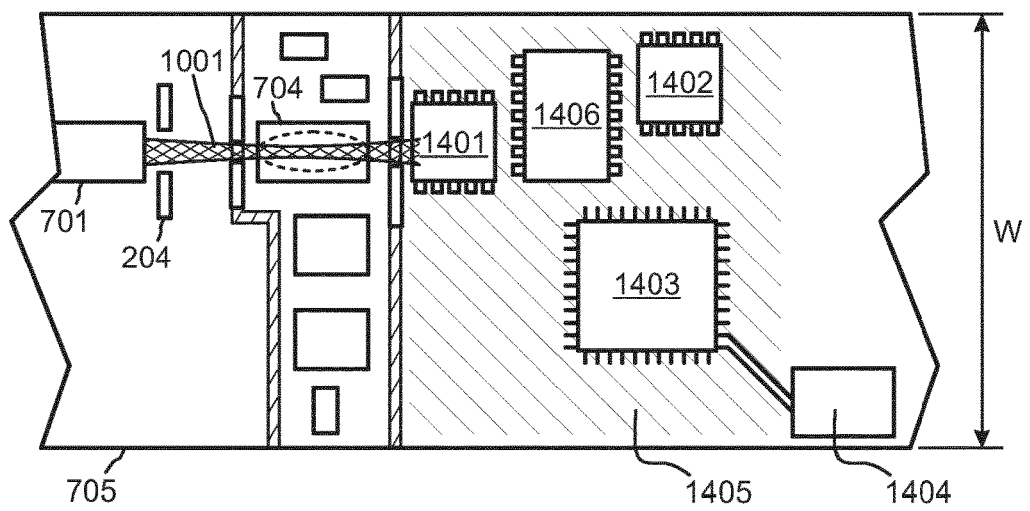
Figure 15:
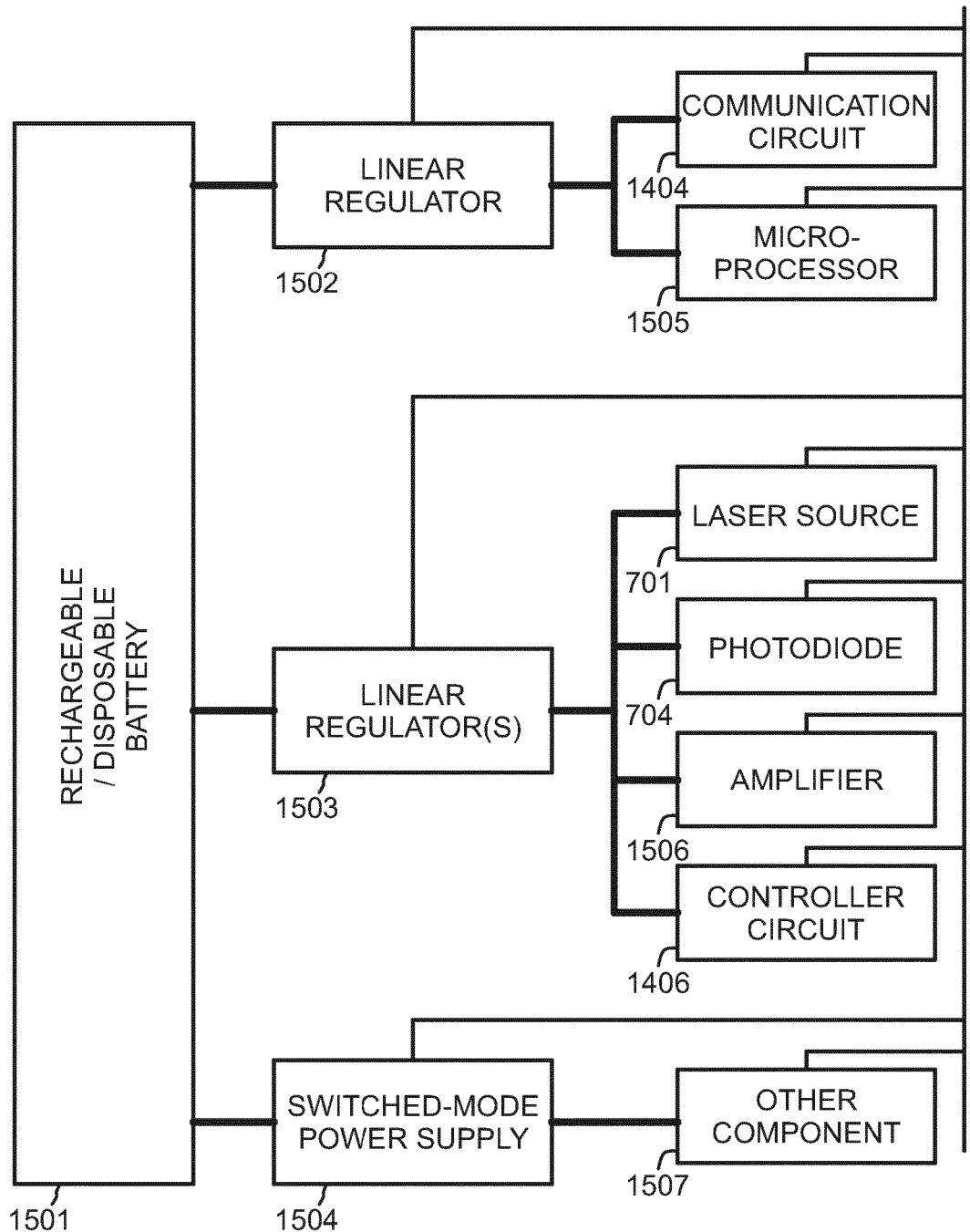
Figure 16:
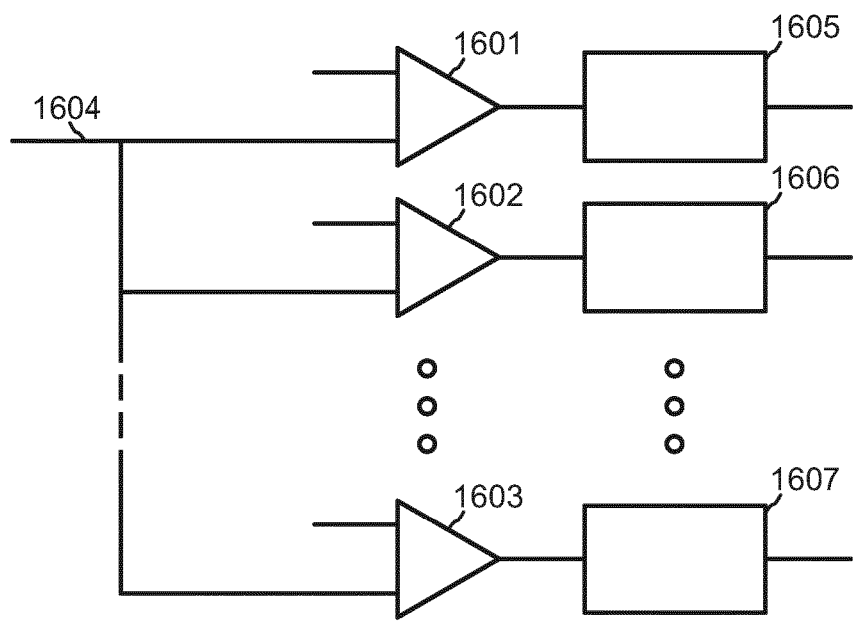

FIG. 1 illustrates a device for measuring the particle content of air according to the prior art, FIG. 2 illustrates a light trap according to one embodiment, FIG. 3 illustrates a light trap according to another embodiment, FIG. 4 is a more detailed illustration of the structure of the light trap according to FIG. 2, FIG. 5 illustrates a light trap according to one embodiment and cores used in the manufacture of the light trap, FIG. 6 illustrates one alternative design of an aperture in an intermediate wall of a light trap, FIG. 7 illustrates a device for measuring the particle content of air according to one embodiment, FIG. 8 illustrates one first intermediate stage in the assembly of the device according to FIG. 7, FIG. 9 illustrates one second intermediate stage in the assembly of the device according to FIG. 7, FIG. 10 illustrates shape and size aspects of a laser beam, target area and light detector, FIG. 11 illustrates some preferred configurations for forming an air channel and a sufficient air flow, FIG. 12 illustrates some preferred configurations for forming a sufficient air flow, FIG. 13 illustrates one example of coupling a light detector and an amplifier, FIG. 14 illustrates one example of the arrangement of components and a ground plane structure on a circuit board, FIG. 15 illustrates a functional block diagram of one device measuring the particle content of air, and FIG. 16 illustrates a controller circuit according to one embodiment.

DETAILED DESCRIPTION OF THE INVENTION

The solutions described in this text are suitable for all type of measurement of particles which are suspended in air, but the specific features of the solutions are advantageous particularly when measuring the content of particles with a diameter of less than about 10 micrometres in "unclean" conditions. The uncleanliness means herein that there may be a considerably higher amount of impurities in the measured air, such as gases, particles and moisture, than in normal outdoor or room air.

It has been understood in the invention that in the context of the presence and measurement of particles of less than about 10 micrometres, it is relevant that the particle population behaves substantially like a gas. In other words, the particle population tends to diffuse into the ambient air in such a way that concentration differences level out by themselves over time. For example, for measuring the particulate content of air in a room or other substantially limited space, it is thus sufficient to measure a relatively small air sample, in particular if it may be assumed that the measured particle content varies rather within minutes than seconds, or even slower.

This essential realization has several implications. Firstly, it may be stated that for performing the particle measurement it is sufficient to have a rather small air flow and no mechanical blower is necessarily needed to provide the air flow. Secondly, when the air is "unclean", it also tends to foul the structure of the measuring device, which over time decreases the measurement reliability—but it is possible to significantly reduce this disadvantage by keeping the airflow small. Thirdly, if the air flow is small, it entrains a rather small amount of particles as a function of time, despite the uncleanliness of the air, so the detection efficiency should be high, i.e. it should be ensured in the measuring arrangement that as large as possible a proportion of the particles entrained with the flow is also reliably detected. Yet another aspect is that the measurement of the small amount of air should most preferably be possible by means of a small device with low enough energy consumption for it to be possible to function for long times even in a battery-operated mode. An unnoticeable and relatively unlimited placement of the small device in a room subjected to the measurement is facilitated if the data transfer connections possibly needed between that and other devices may be implemented wirelessly.

One size factor which essentially affects the size of the particle measuring device is the distance between a laser source and a target area. To be able to make the distance small without stray light produced by the laser source interfering with the measurement, the light trap which limits the stray light should be efficient and functional. Below, some features of the light trap which have been found to be advantageous will firstly be discussed.

FIG. 2 illustrates one light trap 201 which may, if necessary, be installed in a device measuring the particle content of air between a laser source and a target area. The purpose of the light trap is to reduce stray light propagating to the target area. In FIG. 2, the laser source which is used for generating laser light and for directing it to the target area is intended to be located at the back on the left side. A light detector is intended to be located at the front on the right side in such a way that the target area is situated above a square frame 202 shown at the end of the piece illustrated in FIG. 2. A dot-and-dash line 203 represents the propagation direction (and the optical axis) of the laser light.

The light trap 201 comprises intermediate walls which are substantially transverse in relation to the propagation direction 203 of the laser light, each of the intermediate walls having an aperture for passage of a desirably limited amount of the laser light through the given intermediate wall. Intermediate walls 204, 205 and 206 may be discussed as an example herein. That an intermediate wall is substantially transverse in relation to the propagation direction 203 of the laser light may be specifically considered to be a feature of the aperture in the given intermediate wall: the closed curve illustrating the innermost edge of the aperture runs in a plane which is substantially transverse in relation to the propagation direction 203 of the laser light. It may be advantageous in terms of the manufacturing technique that the intermediate walls overall are plate-type, whereby it is easy to perceive how they are transverse in relation to the propagation direction 203 of the laser light.

In the embodiment of which one example may be considered to be the light trap illustrated in FIG. 2, the intermediate walls 204, 205 and 206 are part of a same piece manufactured as one continuous block. The piece may have been manufactured for example by injection-moulding, which is an affordable and quick method for manufacturing large batches with an accuracy which is sufficient for such needs as the device discussed herein. There are also other possible manufacturing methods, such as 3D printing and subtractive manufacturing. One implication of the manufacture as one continuous block is that each of the apertures in the intermediate walls is delimited along the full perimeter of the aperture by a continuous portion of said piece manufactured as one continuous block.

The implication of the above-mentioned feature may be considered by comparing the light trap according to FIG. 2 with another embodiment illustrated in FIG. 3, in which the light trap 301 has not been manufactured as one continuous block, but from interconnectable right and left halves. In the embodiment of FIG. 3, the aperture in each intermediate wall is, even after the assembly stage, delimited by two separate portions of the two, originally separately manufactured pieces, even though they are pressed against each other in the assembly stage. The halves could also be upper and lower halves, whereby the seam crossing each of the apertures in the intermediate walls would be horizontal. From the point of view of the manufacturing technique, it is very difficult or even impossible to produce the structure illustrated in FIG. 3 or other structure consisting of at least two parts in such a way that a small amount of stray light would in no case be able to escape through the seam between the two parts to the other side of the intermediate wall at the point where the edge of the aperture is at its sharpest. Further, the closer to the actual laser beam the edge of the aperture in the intermediate wall is located, the more important it is that the outline of the edge of the aperture is defect-free and has no additional projections or notches. If the light trap is formed from two parts as in FIG. 3, the laser beam passage apertures may not in practice be implemented with a completely round shape, as the halves may not in practice be perfectly fitted to each other. Even a slight error in shape forms a notch at the edge of the aperture, which notch is likely to reflect unwanted light forward towards the light detector. This also causes piecewise variation in performance, which increases the need for calibration both in the manufacture and possibly at a later stage.

In terms of limiting the stray light, it is advantageous to design said apertures specifically in such a way that each aperture has as sharp as possible an innermost edge; in other words, the aperture is not defined by any cylindrical surface which would extend right even for part of the distance through the intermediate wall in a direction of the optical axis of the laser light. The reason is that this type of cylindrical surface delimiting the aperture would operate as a reflector which would reflect forward the light propagating in a direction other than strictly along the optical axis. To be able to ensure that the light detector performs detection of particles scattering the laser light in the target area only, the light trap should as efficiently as possible prevent the access of any other laser light than that propagating in the direction of the optical axis to the target area and its surroundings.

FIG. 4 illustrates in more detail some examples of features in a similar type of light trap as in FIG. 2. FIG. 4 follows the convention of technical drawing, wherein the same object is depicted from the side (centre view), from below (top view), from above (bottom view), from the right (left-side view) and from the left (right-side view). The propagation direction of the laser light is indicated by the dot-and-dash line 203. The light trap illustrated in FIG. 4 comprises intermediate walls 204, 205 and 206 which are substantially transverse in relation to the propagation direction of the laser light. Each of the intermediate walls has an aperture for passage of a desirably limited amount of the laser light through the given intermediate wall. All intermediate walls are part of a same piece manufactured as one continuous block. As one implication, each of said apertures is delimited along the full perimeter of the aperture by a continuous portion of said piece manufactured as one continuous block.

Intermediate wall 205 may be herein designated a first intermediate wall and intermediate wall 206 may be designated a second intermediate wall. The terms "first" and "second" are used herein only to enable unambiguous referencing. The target area is situated on the right side in relation to the light trap illustrated as a side view, and the location of the laser source is on the left side, so when using these designations the first intermediate wall 205 and the second intermediate wall 206 are located in this order in relation to each other from the laser source towards the target area.

The aperture 401 arranged in the first intermediate wall 205 is conical in a cross-section taken along the optical axis 203 of the laser light, such that it is larger from the side of the laser source than from the side of the target area. In other words, the innermost sharp edge 402 of the aperture 401 is located in that part of the aperture 401 which is situated on the side of the target area. Correspondingly, the aperture 403 arranged in the second intermediate wall 206 is conical in a cross-section taken along the optical axis 203 of the laser light, such that it is larger from the side of the target area than from the side of the laser source. In other words, the innermost sharp edge 404 of the aperture 403 is located in that part of the aperture 403 which is situated on the side of the laser source. The design of the apertures as described has an advantageous effect in terms of propagation of the stray light, as the conical surface delimiting the aperture 401 in the first intermediate wall 205 tends to reflect the possible stray light in a backward direction and as the conical surface delimiting the aperture 403 in the second intermediate wall 206 offers for the propagating laser light as little as possible of anything from which it could be reflected.

Most preferably, the light trap also comprises a roof surface delimiting it from above, i.e. from the side which is opposite in relation to the circuit board. Some possibilities for implementing the roof surface will be described in more detail hereinafter. As the device is small in size, and distances between its parts are small, the roof surface may have significance to the design of the light trap. Reference number 405 indicates the area which the light detector "sees" at the roof of the light trap. The dotted lines indicate how this area is determined: it is that area at the roof of the light trap from which it is possible to draw a straight line via the aperture 403 in the second intermediate wall 206 to the active area of the light detector. It would be important to keep this area specifically as dark as possible, i.e. free of the stray light, so that light would not be reflected from there to the light detector. The achievement of this objective is facilitated by the conical design of the aperture 401 in the first intermediate wall 205 as described above, as it is ideal for preventing the stray light from propagating towards the light trap roof between the first 205 and the second intermediate wall 206.

Directing the conical surfaces which delimit the apertures in the above-described way is also advantageous from the point of view of the manufacturing technique, in particular if the light trap is manufactured by injection-moulding or by other method in which a closable mould is used. Said advantage is illustrated in FIG. 5, which presents the same light trap from the side as FIG. 4 with two cores 501 and 502 depicted above the light trap for possible use inside the injection mould to create the shapes of the inner parts of the light trap. The left-side core 501 comprises for example a conical portion 503 which forms the conical inner surface of the aperture 401 in the first intermediate wall 205 in the injection moulding. The right-side core 502 comprises for example a conical portion 504 which forms the conical inner surface of the aperture 403 in the second intermediate wall 206 in the injection moulding. The arrows in FIG. 5 indicate how the cores 501 and 502 are pushed towards each other in the injection mould closing stage in such a way that the ends of the cores are pressed against each other at dashed line 505. The directions of the conical surfaces and also other dimensions of the apertures in the intermediate walls are selected such that the cores 501 and 502 may be easily drawn out in the stage of opening the injection mould.

It should be noted that the term "conical" does not necessarily refer to a right circular cone, and the term is not used in any other respect in the mathematically strict sense in this connection, but is intended to mean that the aperture is larger at one surface of the intermediate wall than at the other surface. According to the mathematical definition, a cone is a surface drawn by a half-line as it moves along a closed and not self-intersecting curve in a plane in such a way that the end point of the half-line stays immovable. The surfaces which delimit the apertures in the intermediate walls are mainly frustoconical, and their edge lines need not be circles, and the imaginary line drawn from one edge line to the other need not be straight. FIG. 6 illustrates a detail of one alternative design, in which the conical surface delimiting the aperture 403 in the second intermediate wall 206 consists of a circular cone shaped portion 601 and a planar portion 602 which intersects it. The planar portion 602 is situated on that side of the aperture which is proximate to the light detector (not illustrated in the figure) to be arranged adjacent to the second intermediate wall 206. Although the planar portion may then reflect some stray light also to that side of the second intermediate wall 206 where the light detector is located, the reflections are directed diagonally upwards, i.e. away from the light detector, and do not cause problems.

The number of the intermediate walls in the light trap is relevant. The larger the number of the intermediate walls, the more there are obstacles along the path of the stray light and the more efficiently it is possible to prevent propagation of the stray light to the target area. On the other hand, the larger the number of the intermediate walls, the more complicated and expensive it is to manufacture the light trap. In the embodiments illustrated in FIG. 2-5, the light trap comprises three intermediate walls: in addition to the above-designated first intermediate wall 205 and second intermediate wall 206, there is a third intermediate wall 204 which is arranged between the laser source and the first intermediate wall 205 and which has an aperture 406 that is conical in a cross-section taken along the optical axis 203 of the laser light, such that it is larger from the side of the laser source than from the side of the target area. Because in the embodiments illustrated in FIG. 2-5 the laser source is intended to be arranged right against the third intermediate wall 204, and because the laser source itself may comprise structures which reduce the immediately closest stray light, the third intermediate wall 206 is not necessarily needed. On the other hand, the third intermediate wall as illustrated in FIG. 2-5 may be useful just for the purpose of defining with precision the position where the end of the laser source is located in relation to the light trap.

Also in other respects it is advantageous if the light trap is shaped in such a way that it defines with precision how the laser source is positioned in relation to the structures preventing propagation of the stray light in the light trap and in relation to the target area. With precise positioning it may be ensured that the devices manufactured in serial production provide exactly identical air quality measurement results and avoid errors which could be caused by purely mechanical differences between different devices.

For the purpose of precise positioning of the laser source, the piece manufactured as one continuous block as illustrated in the light traps of FIG. 2-5 forms a holder for the laser source. It is assumed herein that the laser source comprises a laser diode and optics located in a common, preferably cylindrical housing. In the embodiments illustrated in FIG. 2-5, the holder begins at the third intermediate wall 204 and continues from there in a direction away from the target area as a cylindrical recess 407 which is horizontal in relation to the position illustrated in the figures. This horizontal cylindrical recess may be manufactured for example by forming a cylindrical portion 506 in a relevant part of the left-side core 501 illustrated in FIG. 5. It is advantageous to extend edges 408 defining the sides of the cylindrical recess 407 which is formed by means of the core to a somewhat higher level than the centre axis of the cylindrical recess, as this way they provide natural holder claws which prevent the installed laser source from moving out of place in the vertical direction.

Further for the purpose of precise positioning of the parts of the device relative to each other, the light trap of FIGS. 4 and 5 comprises fastening pins 409 by means of which it may be fastened into recesses or holes in a flat substrate, for example a circuit board. If the substrate is a circuit board, it may be the same circuit board on which the light detector of the device is mounted. Typically, circuit boards are manufactured and components are placed on the circuit boards by means of robot work, whereby the position of the holes made in the circuit board—and thus also the position of the light trap-laser source combination fastened in the holes— relative to the light detector placed on the circuit board stays very precisely identical from one device to another.

The above-described principles on the structure of the light trap contribute to providing the device for measuring the particle content of air as disclosed in this description in a relatively small size. As one example it may be assumed that the diameter of the cylindrical housing of the laser source is 3-6 millimetres, preferably 4 millimetres, and its length is 6-15 millimetres, preferably 10 millimetres. As an extension of the housing there may be circuit board portions, connectors, or other parts at the end which is opposite in relation to the end generating the laser light. In the light trap, the cylindrical recess 407 in which the laser source is installed corresponds in diameter to the diameter of the cylindrical housing of the laser source, and its length may be 5-10 millimetres, preferably 8 millimetres. The thickness of each of the intermediate walls 204, 205, 206 may be 0.5-2 millimetres, preferably 1 or 1.5 millimetres. In the above-designated terminology the second intermediate wall 206 which is proximate to the light detector may be thicker than the other intermediate walls, for example in such a way that the thickness of the other intermediate walls 204 and 205 is 1 millimetre and the thickness of the second intermediate wall 206 is 1.5 millimetres. In a light trap manufactured by injection moulding, the intermediate walls may slightly thin down towards the direction in which the part of the mould forming the planar surfaces of the intermediate walls moves when the injection mould is being opened. The distances between the intermediate walls from one surface to another may be 2-6 millimetres, for example in such a way that the distance between the first 205 and the second 206 intermediate wall is in the range of 4-5 millimetres and the distance between the third 204 and the first 204 intermediate wall is 3-4 millimetres.

The dimensions of the apertures in the intermediate walls depend on how thick is the laser beam generated by the laser source and how it is to be directed to the target area. As one example, the aperture 401 in the first intermediate wall 205 has a minimum diameter of 1.5-2 millimetres at edge 402 and the angle of the side of the conical surface delimiting the aperture in relation to the propagation direction 203 of the laser light is 25 degrees. As another example, the aperture 403 in the second intermediate wall 206 has a minimum diameter of 1.5-2 millimetres at edge 404 and the angle of the side of the conical surface delimiting the aperture in relation to the propagation direction 203 of the laser light is 20 degrees. If the conical surface delimiting the aperture 403 comprises a partly planar portion as in FIG. 6, the angle of the planar portion in relation to the propagation direction 203 of the laser light may be smaller, for example 2 degrees. As a third example, the aperture in the third intermediate wall 204 has a minimum diameter of 2.5-3 millimetres and the angle of the side of the conical surface delimiting the aperture in relation to the propagation direction 203 of the laser light is 2 degrees.

FIG. 7 is a simple exploded view illustrating some parts of a device for measuring a particle content according to one embodiment. The device comprises a laser source 701 for generating laser light and for directing it to a target area. The laser source 701 comprises a laser diode and optics located in a common housing 702. The housing 702 is in this embodiment cylindrical, and the laser beam is output through a round aperture 703 at one end of the housing 702. The optical axis of the generated laser light coincides with the longitudinal axis of the cylindrical housing 702. The supply of operating voltage to the laser diode is provided via conductors 704 illustrated at the opposite end of the housing 702.

The housing 702 of the laser source 701 is mechanically supported to the light trap 201 which is a piece manufactured as one continuous block. The dashed lines indicate how the laser source 701 may be slid in the longitudinal direction to its place in the cylindrical recess provided as an extension of the light trap 201 in a direction which is opposite in relation to the direction of the target area. The precise longitudinal position of the laser source 701 in its holder is determined by sliding it in its longitudinal direction until its end contacts the third intermediate wall 204 in the light trap 201.

The device comprises a light detector 704 located adjacent to the target area for detecting bursts of light generated as the particles entrained with the air flow scatter the laser light in the target area. The device comprises a circuit board 705 to which the light trap 201 and the light detector 704 are fastened and to which other electronic components 706 of the device may also be fastened. The circuit board 705 functions in a normal way as a mechanical support structure for the components, and the electrical connections required for the components may also be provided in the normal way on the surface or surfaces of the circuit board (and in the case of a multilayer circuit board, also in the intermediate layers).

FIG. 7 illustrates one advantageous feature which may be utilized in case the piece manufactured as one continuous block forming the light trap 201 comprises one or more open regions on its side arranged against the circuit board 705. In this case one or more of the other electronic components 706 of the device may be located on the circuit board 705 such that they are arranged at these open regions between the intermediate walls of the light trap 201. This saves circuit board space, as the components may be located also in those areas of the circuit board which remain under the light trap 201 in the assembled structure. It is advantageous to position specifically black-coloured components this way, as they thereby function as part of the light trap by absorbing the stray light. In addition to or instead of the open regions, the side of the light trap arranged against the circuit board may comprise recesses which are sufficiently spacious for the components lying thereunder to fit in their places.

The device comprises an air channel for directing the air subjected to the measurement as an air flow through the target area. FIG. 8 illustrates an intermediate assembly stage in which the laser source 701 is fastened to the light trap 201, and the unit formed thereby is fastened to the circuit board 705. To form the air channel, this unit is joined to a cover element 801, one hollow portion 802 of which delimits for its part the air channel. In that part of the air channel which is provided as an extension of the optical axis of the laser beam after the target area, a laser beam exit aperture 803 is advantageously arranged. FIG. 9 illustrates a next assembly stage, in which the cover element 801 is in its place and covers the laser source, the light trap, and the light detector.

The cover element 801 may be a part which is formed merely for the purpose of delimiting the air channel, or it may have other functions. As an example of the other function in the embodiment illustrated in FIG. 7-9, a so-called roof portion 804 of the cover element 801 is pressed over the light trap 201, closing the compartments between the intermediate walls of the light trap from above. The seam which in this case is formed between the intermediate wall of the light trap 201 and the roof portion 804 of the cover element 801 does not cause similar problems as the seams crossing each intermediate wall in the two-part light trap illustrated in FIG. 3. This is because in the structure of FIG. 8, the seams are formed far from the areas where the laser light is at its brightest. If necessary, the light-tightness of the seams may be improved by using interlockable matching shapes in the parts.

The cover element 801 may also be part of a general housing of the device, such that one portion of an outer cover of the device functions as the cover element 801, or at least as part of the cover element.

It is advantageous to shape the air channel in such a way that no such components mounted on the circuit board 705 are left inside the air channel which are not to be subjected to the impurities such as grease and/or moisture entrained along the air to be measured. FIG. 8 illustrates with hatching those areas of the circuit board 705 against which the edges of the hollow portion 802 of the cover element 801 are pressed and outside which the components are therefore protected from the impurities of air. The portion of the surface of the circuit board 705 which is left between the shaded areas delimits for its part the air channel, as also does the end of the light trap 201 on the side the light detector. Depending on the design of the air channel, also other structures of the light trap 201 may participate in delimiting the air channel.

FIG. 10 illustrates one example of the behaviour of the laser light in the target area. The figure illustrates a light detector 704 and a laser beam 1001, the propagation direction of which in the figure is from the front left to the back right. The active area of the light detector 704 is the upper surface of the rectangular cuboid illustrated in the figure.

The laser beam 1001 is focused. In other words, it is assumed herein that the optics of the laser source comprises at least one convex lens, whereby according to the properties of the lens the optics forms a focal point for the laser beam 1001 at distance f from the laser source. The focal point is preferably not completely point-like, but the diameter d of the focused laser beam at the focal point is most preferably selected to be in the range of 0.2-0.5 millimetres. In proximity to the focal point the laser beam is thereby shaped as an hourglass in such a way that the narrowest point of the hourglass is spaced from the laser source at distance f and its width is d. The extent of the focal length f, i.e. the distance from the laser source to the centre of the target area, is 10-20 millimetres, preferably 14 millimetres.

A particle entrained into the laser beam scatters the laser light in substantially all directions. For the purpose of detecting the bursts of light, it is not necessary to define a precise length for the target area in the direction of the laser light: the target area includes the entire three-dimensional volume which the laser beam 1001 fills as it propagates through the air channel. However, the detection of the bursts of light is at its most efficient in that part of this volume which is located perpendicularly above the light detector 704, as the distance from this part to the light detector is the shortest and the solid angle at which the propagating light hits the light detector is the largest. FIG. 10 indicates by hatched end circles how this part is located in the longitudinal direction of the laser beam.

It is advantageous to position the light detector 704 in such a way that the centre of its active area is perpendicularly below the focal point of the laser beam 1001 (X=X in FIG. 10) and the perpendicular distance is as small as possible. The references to above and below are to be understood herein only as references to directions in FIG. 10. The substantially same feature may be described by stating that the shortest distance between the focal point of the laser beam 1001 and the centre of the active area of the light detector 704 is advantageously provided as small as possible. In this case the solid angle which the active area of the light detector 704 covers as seen from the focal point of the laser beam 1001 is as large as possible.

The active area of the light detector 704 is preferably elongated in the direction of the optical axis of the laser light (2X>Y in FIG. 10). This feature is advantageous because the target area itself is elongated: an elongated active area of the light detector provides a good compromise between saving the circuit board space and the efficiency of detecting the bursts of light. A width Y of the active area in a direction perpendicular to the optical axis of the laser light may be less than 4 millimetres, most preferably less than 2 millimetres.

FIG. 11 illustrates parts of a device for measuring the particle content of air according to one embodiment. The assembly stage of the device illustrated in FIG. 11 corresponds to FIG. 8 hereinabove, without the cover element being illustrated in FIG. 11. The device comprises a laser source 701 for generating laser light and for directing it to a target area, and an air channel for directing the air subjected to the measurement as an air flow through the target area. The air channel is formed in the embodiment of FIG. 11 in the same way as in FIG. 8, i.e. such that the unit illustrated in FIG. 11 is fastened to a cover element (not shown in the figure), whereby the edges of one portion of the cover element are pressed against the circuit board 705 at areas indicated by dashed lines. The inlet and outlet ends of the air channel are illustrated as hatched rectangles. The device also comprises a light detector 704 located adjacent to the target area for detecting bursts of light generated as the particles entrained with the air flow scatter the laser light in the target area.

The device according to the embodiment of FIG. 11 further comprises another electronic component 1101, the properties of which include that in order to operate, it must be brought to a temperature different from the ambient temperature. As illustrated in FIG. 11, the electronic component 1101 is located in the air channel of the device (i.e. on the circuit board 705 in the area delimited by the dashed lines) for convectively providing an air flow.

That the electronic component 1101 must be brought to a temperature different from the ambient temperature in order to operate does not mean that it would reach the temperature different from the ambient temperature as a by-product or result of its normal operation. In other words, this definition does not signify for example just a resistor which warms up as electric current passes through it, because a resistor operates completely normally as a resistor already before it has warmed up. It is a component which must be brought to a temperature different from the ambient temperature before it starts operating in the intended way. One example of this type of component is a metal oxide gas detector which must be heated significantly hotter than the ambient temperature in order to operate, preferably to 300 degrees Celsius. Another example of a component which must be brought to a temperature different from the ambient temperature in order to operate is a PIN diode or other semiconductor radiation detector which must be cooled colder than the ambient temperature to achieve a sufficient signal/noise ratio.

The light detector 704 and the above-mentioned other component 1101 are mounted on the same surface of the circuit board 705, which surface of the circuit board 705 also for its part delimits the air channel. This simplifies the structure, because not so many other structural elements or complicated designs will be needed for delimiting the air channel as in the case where it would be completely formed for example from the cover element or elements of the device. For the convective flow at the light detector 704 to be as efficient as possible, it is advantageous that the light detector 704 and the other component 1101 are located rather close to each other. Their spacing as measured in the direction of the air channel may be for example less than 20 millimetres or even less than 10 millimetres.

For providing the convective flow, it is also relevant how the air channel is oriented in relation to the local vertical direction. If it is assumed that the other component providing the convective flow is a warmable component such as a metal oxide gas detector, it is intended to provide an upwardly directed air flow. This type of example is illustrated in FIG. 12 which is a simplified cross-section of a device for measuring the particle content of air according to one embodiment.

The device of FIG. 12 comprises an outer cover 1201, the design of which is arranged to determine the intended position of the device after installation. In FIG. 12, this is implemented in such a way that the outer cover 1201 comprises two flat and gapless surfaces (upper surface and left side surface), which after installation will be arranged against some two fixed horizontal or vertical surfaces. Additionally or instead, the outer cover may comprise for example screw holes or other designs which in practice determine in what position in relation to the local vertical the device is intended to lie after being installed for use according to the normal purpose. If the device is for example a stove guard, the installation location and position must be such that the field of view of an optical detector 1202 of the device is directed to the area of the stove.

The outer cover 1201 comprises an air channel inlet opening 1203 and outlet opening 1204. The air channel is illustrated in FIG. 12 only schematically as a hatched region enclosing the light detector 704 and the above-described other component 1101 which must be brought to a temperature different from the ambient temperature in order to operate. In the air channel, adjacent to the light detector 704 there is also a target area for the laser light, which is located towards the viewer from the illustrated end of the light trap 201. The surface of the circuit board 705 and any such part of the outer cover 1201 which operates as the cover element of FIG. 7-9 as described hereinabove may for their part delimit the air channel.

In the intended position of the device the outlet opening 1204 is higher in relation to the local vertical direction than the inlet opening 1203. The orientation of the air channel may be determined by the disposition of the inlet opening 1203 and the outlet opening 1204, but also by the position of the circuit board 705 inside the outer cover 1201. In the embodiment of FIG. 12, above the diagonally positioned circuit board 705, there is a disposable or rechargeable battery 1205 or other internal DC voltage source for providing the operating voltage needed by the device.

The inlet opening 1203, the outlet opening 1204 or both of them may also be functional openings for the operation of some other part of the device. This means that the only purpose of the given opening is not to direct the air subjected to the measurement into the air channel or out from the air channel, but the opening has also another purpose relating to some other part of the device which does not participate directly in measuring the particle content of air. This type of other device may be for example an optical detector, whereby the other purpose of the given opening may be to direct and/or limit the field of view of the optical detector. The other device may also be for example a speaker or a microphone, whereby the other purpose of the given opening may be to allow an unhindered propagation of sound. Yet another example of the other device is a user-operated switch, whereby the other purpose of the given opening is to allow the movement of a moving part that forms at least part of the switch.

FIG. 11 further illustrates an advantageous feature whereby the air channel forms bends on both sides of the light detector 704 for reducing the stray light which propagates to the light detector from outside of the device. In the embodiment of FIG. 11 the bends are located symmetrically on both sides of the light detector 704, such that the air channel turns by 90 degrees towards the laser source immediately adjacent to the light detector 704, and again by 90 degrees at the laser source, but this is not necessary, and the bends of the air channel may be designed in such a way as to best combine their purpose with easy manufacture of the device parts. In addition to the stray light, the effect of random air movements from outside of the device on the measurement may be reduced by means of the design of the openings and the bends of the air channel, as the breathing of the user or other random air movement is not able to directly affect the air flow in the target area.

As one additional feature, FIG. 11 illustrates a reflective wall 1102 which is located in the air channel and the purpose of which is the same as that of the bends, i.e. to reduce the stray light propagating from outside and/or the effect of random air flows in the target area. On the circuit board, the housing elements, and/or other suitable structural part, one or more exiting laser beam reflectors 1103 may also be formed for the purpose of reflecting the laser light after it has propagated through the target area to some direction from which its subsequent reflections and scatters do not easily find their way back towards the light detector. The reflector 1103 is advantageously located so far from the laser beam exit aperture in the air channel (see reference number 803 in FIG. 8) that it is not possible to draw a straight line which would coincide with the light detector from the surface of the reflector through the laser beam exit aperture. This ensures that the laser light which is diffusely reflected from the reflector 1103 does not in itself cause interference in the particle measurement.

Also the structures of the light trap may participate in delimiting the air channel and preventing the external stray light from propagating to the light detector. An example of this is the rectangular frame 202 illustrated in FIGS. 2-5, 7-8 and 11 as part of that end of the light trap which is proximate to the target area, the frame forming a border which encloses the active area of the light detector. Due to the frame 202, the light detector is arranged as if in a recess, whereby it is not very easily reached by the possible stray light which propagates along the air channel. At the same time, the frame 202 may reduce fouling of the light detector and improve the particle detection efficiency, because on the one hand it directs the air flow locally slightly higher past the light detector, and on the other hand makes the height of the air channel locally smaller so as to focus the air flow to the laser beam in the target area.

FIG. 13 is a simplified circuit diagram illustrating one manner which is known per se for using a light detector for the detection of bursts of light. In the circuit of FIG. 13, the light detector is a photodiode 1301 which is biased in a reverse direction. The bias voltage is supplied from a voltage source 1302, and its level may be changed and/or regulated by means of a regulator 1303. A ballast resistor 1304 is arranged between the cathode of the photodiode 1301 and the positive terminal of the bias voltage. The cathode of the photodiode 1301 is coupled to an inverting input of a differential amplifier 1305. A reference potential which is generated from the bias voltage by means of a potentiometer 1306 is coupled to a non-inverting input of the differential amplifier 1305. When there is no light hitting the photodiode 1301, there is no current flowing through it, and the potential of the inverting input of the differential amplifier 1305 is substantially the same as the potential of the positive terminal of the bias voltage. When light hits the photodiode 1301, current starts flowing through it, which is detected as a drop of the potential of the inverting input of the differential amplifier 1305. If the potential of the inverting input drops below the reference potential, the output of the differential amplifier 1305 generates a positive signal. From the duration and form of the signal it is possible to conclude the amount of the light which hit the photodiode 1301 and the time for which this light was detectable.

Applied to a particle measuring device, the above-described operating principle means that the particle content of air may be calculated from the number of the output pulses generated by the amplifier per time unit. Further, from the form and duration of an individual pulse it is possible to make conclusions on the size and form of the particle which caused the burst of light that gave rise to the pulse. The arrangement may comprise several amplifiers which are coupled to the same light detector, whereby each of the amplifiers has a specific reference potential. This way, different amplifiers may be tuned to detect different particle sizes, whereby the relative amounts of the output pulses generated by the amplifiers indicate the distribution of different particle sizes in the measured air.

In addition to the example illustrated in FIG. 13 there are also other manners known per se in which a light-sensitive component may be coupled as a part to a detector circuit in such a way that it may be used for the detection of bursts of light. When applied to particle measurement, it is common to them that the original signal generated by the light-sensitive component (in FIG. 13, increase of the reverse-direction conductivity of the photodiode 1301 and the resulting drop of potential at the cathode of the photodiode 1301) is small and it must be considerably amplified to be able to estimate the form and duration of the signal. In order for the estimation to be reliable, the amplifier arrangement (which in FIG. 13 is represented in a simplified manner by the differential amplifier 1305) must be as low-noised as possible and the arrangement must be isolated as efficiently as possible from electromagnetic interference generated elsewhere.

Isolation from other sources of interference in the same device, i.e. in short distance (component-specific) EMC shielding, may require special protective structures, particularly if the device includes other components which inherently generate much electromagnetic interference. Such other components are for example relays, wireless transceivers and switched-mode power supplies. The protective structures used include for example ground plane structures formed in the circuit board and electrically conductive EMC protection enclosures which are soldered or glued onto the circuit board surface. A ground plane structure denotes herein such an ensemble of conductor areas formed on the surfaces and/or in intermediate layers of the circuit board and coupled to a local ground potential which is specifically formed for the needs of the components to be protected by means of the ground plane structure, and which is not merely a part of a general ground plane of the device. The general ground plane of the device is typically a conductor area which is formed as continuously as possible on a specific surface or in a specific intermediate layer of the circuit board and which is common to all the components fastened to the same circuit board or to a significant portion of the components, such as to all analogue components or all digital components. The efficiency of the ground plane structure in EMC shielding is generally the better the larger the area of the circuit board which may be covered by the ground plane structure around the components to be protected and—in the case of a multilayer circuit board—the larger the number of the circuit board layers to which the ground plane structure may be extended.

One way in which it is possible to provide the device for measuring the particle content of air with a small size while maintaining a good EMC shielding of the key components and straightforwardness of the structure and manufacturing technique of the device is to locate two or more of such key components in an area covered by a common ground plane structure. If these key components are used non-simultaneously, they do not interfere with each other, but each of them may utilize the ground plane structure during its operation as if it would be part of the specific EMC shielding of the given component only.

FIG. 14 illustrates an example of this type of embodiment. FIG. 14 illustrates part of one device for measuring the particle content of air. The device comprises a laser source 701 for generating laser light and for directing it to a target area which is indicated in the figure as a dashed-line ellipse. The device comprises a circuit board 705 and an air channel for directing the air subjected to the measurement as an air flow through the target area. That part of the circuit board 705 which delimits the air channel is located between the narrow hatched sections. The laser light forms a laser beam 1001 which is focused to the target area. For reducing stray light, the device may comprise a light trap, the intermediate wall 204 being illustrated as an example of the structures of the light trap in FIG. 14.

A light detector 704 is located adjacent to the target area for detecting bursts of light generated as the particles entrained with the air flow scatter the laser light in the target area. An amplifier is coupled to the light detector 704 for amplifying electrical signals corresponding to the bursts of light which are detected by the light detector. In FIG. 14 the amplifier consists of several amplifier elements included in integrated circuits 1401 and 1402. The light detector 704 and the components 1401 and 1402 including the amplifier are mounted on the circuit board 705.

The device comprises a microprocessor which is not illustrated in FIG. 14, as it is located on the circuit board 705 outside the area illustrated in FIG. 14. The microprocessor is used for executing the programmable functions of the device. Further, the device comprises a communication circuit 1403 which is separate from but coupled to the microprocessor and which is mounted on the circuit board 705 for maintaining external communication connections between the microprocessor and other devices which are external to the device. The communication circuit 1403 may be equipped for example to maintain wireless connections such as Wi-Fi connections in accordance with the IEEE 802.11 standard, and an antenna 1404 may be coupled to the communication circuit.

The communication circuit 1403 and the amplifier (i.e. the components 1401 and 1402 including the amplifier) are located on the circuit board 705 in an area covered by a common ground plane structure 1405 which is intended for reducing electrical interference. The ground plane structure 1405 is schematically indicated in FIG. 14 by diagonal hatching. The width W of the circuit board 705 may be relatively small, for example 15-20 millimetres, and the size of the ground plane structure 1405 in a direction defined by the plane of the circuit board may be less than 20×20 millimetres. If the circuit board 705 is a multilayer circuit board in which the most part of one surface is covered by a general ground plane of the device, the ground plane structure 704 may be located inside the multilayer circuit board, separated from the general ground plane by at least one isolation layer.

The communication circuit 1403 and the amplifier are both components for the undisturbed and efficient operation of which it is advantageous that the ground plane structure 1405 used for the EMC shielding of the components is large in relation to the size of the components and—in the case of a multilayer circuit board—covers parts of multiple layers of the circuit board. Also for the operation of the antenna 1404 of the communication circuit 1403, it may be beneficial if there is a ground plane structure which is as large and efficient as possible in proximity to the antenna. On the other hand, the communication circuit 1403 and the amplifier are components which could electrically interfere with each other during their operation. Particularly the communication circuit 1403 is characteristically a component the normal operation of which may generate so much interference that the use of the amplifier for amplifying the electrical signals corresponding to the smallest bursts of light which are detected by the light detector 704 with sufficient precision would become impossible. Therefore, it is advantageous that the microprocessor is programmed to arrange the amplifier and the communication circuit 1403 to operate non-simultaneously.

One measuring period for the duration of which the microprocessor is programmed to arrange the amplifier to be switched on and the communication circuit to be switched off is advantageously selected such that it is possible to obtain relevant measurement results during the period. In estimating the measuring period, the amount of the air flow passing through the target area and the assumed particle contents which the device is intended to measure should be taken into consideration. If the cross-sectional surface area of the air channel is at most only some square millimetres, and the primary cause of the air flow is convection, one measuring period may be for example 1-10 seconds. Said convection may be generated for example by placing in the air channel some other electronic component which must be brought to a temperature different from the ambient temperature in order to operate.

That the common ground plane structure covers both of the amplifier and the communication circuit 1403 which are arranged on the same surface of the circuit board 705 means that it is possible to make the ground plane structure larger as compared to either of said components only having its own specific ground plane structure surrounding the component. A relatively large ground plane structure means that the ground plane structure alone will provide rather efficient EMC shielding. The sufficient level of EMC shielding may be achieved even if the device does not have an electrically conductive EMC protection enclosure on the surface of the circuit board to cover one of the amplifier and the communication circuit 1403. This is advantageous in terms of costs and the manufacturing technique, because the EMC protection enclosure and its fastening to the circuit board may be completely left out from the device component list and from the assembly process.

In addition to or instead of what has been described above, also other advantages may be provided by timing the operation of different device parts relative to each other. A controller circuit may be considered as an example, which controller circuit is intended for processing the amplified electrical signals, and which in the schematic illustration of FIG. 14 may be circuit 1406. Like the communication circuit 1403, the controller circuit 1406 may be a circuit which is separate from but coupled to the microprocessor executing the programmable functions of the device. According to one aspect, compared to the microprocessor the controller circuit 1406 may be a simple circuit and consume only a small amount of power; according to another aspect, the operation of the microprocessor may have only little relevance during the time when the actual particle measurement is switched on. Thus, the microprocessor may be programmed to enter a power-saving mode at least for the most part of the time during which the controller circuit 1406 is arranged to operate, i.e. to process the above-described amplified electrical signals which are generated by the amplifier. The most part of the time denotes a larger than 50% proportion of the given time.

FIG. 15 illustrates one functional arrangement of the device parts by way of example. Electric power distribution lines are illustrated with thicker lines and control and signal connections are illustrated with thinner lines. In the arrangement of FIG. 15, the source of electric power used by all of the device parts is a rechargeable or disposable battery 1501. The operating voltages needed by different parts of the device are generated and stabilized using linear regulators, examples of which are linear regulator blocks 1502 and 1503, and/or switched-mode power supplies 1504.

FIG. 16 illustrates one example of the controller circuit 1406 which may be used for processing the amplified electrical signals corresponding to the bursts of light detected by the light detector. The controller circuit comprises in this example a plurality of comparator circuits 1601, 1602, 1603, each arranged to compare the electrical signals which are supplied over an input line 1604 and amplified by the amplifier with a reference specific to the given comparator circuit. Each comparator circuit is arranged to generate an output signal in response to the comparison indicating that the reference is reached or exceeded. The references are presented symbolically and they may mean for example references indicating the amplitude, duration, form or other feature of the amplified signal. Each comparator circuit thus substantially checks when the electrical signal delivered from the amplifier meets a specific condition, and generates a corresponding output signal. The comparator circuits 1601-1603 may be for example analogue comparator circuits which need only very low electrical power to operate, but also the use of digital comparator circuits is possible.

The controller circuit of FIG. 16 comprises one or more counters which are illustrated by reference numbers 1605, 1606 and 1607. The counters are coupled to receive the output signals of the comparator circuits and to count the number of the output signals. By studying the values accumulated in the counters 1605-1607, it is thus possible to find out how many times each comparator circuit has detected the features corresponding to its specific reference in the electrical signal supplied from the amplifier.

In the functional arrangement according to FIG. 15 the power consumption of the microprocessor 1505 when it is operating may be several milliamperes, for example 5 milliamperes. If the controller circuit 1406 contains only the necessary functions, its power consumption when it is operating may be significantly less than one milliampere, for example 150 microamperes. One measuring period during which the controller circuit 1406 is operating and the most part of which the microprocessor 1505 spends in the power-saving mode may have a length in the range of 1-10 seconds. The time which the microprocessor 1505 then spends, after waking up from the power-saving mode, in reading the counters 1605-1607, processing and storing the read data, and possibly communicating via the communication circuit 1403 may be just seconds, or even less than one second. With this type of switching, it is thus possible to save a considerable amount of electrical energy, which means that the electrical energy supplied by the rechargeable or disposable battery 1501 lasts for a considerably longer time than if the microprocessor 1505 would be operating continuously.

As stated above, if the device comprises one or more switched-mode power supplies 1504 for generating the operating voltages for at least part of the electronic device components, it is advantageous to program the microprocessor 1505 to arrange the operation of this or these switched-mode power supplies to be non-simultaneous with the operation of the controller circuit 1406. This is to ensure that the high-frequency electromagnetic interference generated inherently by the switched-mode power supplies does not interfere with the operation of that unit formed by the amplifier 1506 and the controller circuit 1406 which is tuned to measure the presence of even the smallest particles in the measured air.

A device in which the measurement of the particle content of air as described is performed may be for example a stove guard, i.e. a device according to standard EN 50615, which is intended for watching over the safe use of a stove and, if necessary, issuing an alarm and/or switching off the operating power to the stove or part of the stove to prevent a dangerous situation. In the stove guard application, the reliability and versatility of operation may be improved by measuring the particle content of air, as the measurement of the particle content of air gives much information which the more traditional types of stove guard detectors such as infrared thermometers do not reveal. Other possible applications are for example general measurement of indoor air quality in homes or public facilities, monitoring the particle content of air during construction work at a construction or renovation work site, measurement of the particle content, such as the pollen content, of outdoor air and so on.

The invention claimed is:

1. A device for measuring the particle content of air, the device comprising:
    a laser source for generating laser light and for directing it to a target area,
    an air channel for directing the air subjected to the measurement as an air flow through the target area,
    a light detector located adjacent to the target area for detecting bursts of light generated as the particles entrained with said air flow scatter said laser light in the target area, and
    a light trap between said laser source and said target-area air channel for reducing stray light propagating to the target area, the light trap comprising at least two intermediate walls which are substantially transverse in relation to the propagation direction of said laser light, each of the intermediate walls having an aperture for passage of a desirably limited amount of the laser light through the given intermediate wall, wherein
    said at least two intermediate walls are part of a same piece manufactured as one continuous block, such that each of said apertures is delimited along the full perimeter of the aperture by a continuous portion of said piece manufactured as one continuous block,
    said at least two intermediate walls include a first intermediate wall and a second intermediate wall, located in this order from the laser source towards the air channel,
    the aperture in the first intermediate wall is conical in a cross-section taken along an optical axis of the laser light, such that it is larger from the side of the laser source than from the side of the air channel, and
    the aperture in the second intermediate wall is conical in a cross-section taken along the optical axis of the laser light, such that it is larger from the side of the air channel than from the side of the laser source.

2. The device according to claim 1, wherein said piece manufactured as one continuous block has been manufactured by injection moulding.

3. The device according to claim 1, wherein
    said at least two intermediate walls further include a third intermediate wall which is arranged between said laser source and said first intermediate wall, and
    the aperture in the third intermediate wall is conical in a cross-section taken along the optical axis of the laser light, such that it is larger from the side of the laser source than from the side of the target area.

4. The device according to claim 1, wherein said piece manufactured as one continuous block forms a holder for said laser source for holding it in a pre-selected position in relation to said target area.

5. The device according to claim 1, wherein part of said piece manufactured as one continuous block forms a frame surrounding an active area of said light detector.

6. The device according to claim 1, wherein a distance from said laser source to a center of said target area is 10-20 millimeters.

7. The device according to claim 5, wherein
    the active area of said light detector is elongated in a direction of the optical axis of the laser light, and
    the width of said active area in a direction perpendicular to the optical axis of the laser light is less than 4 millimeters, most preferably less than 2 millimeters.

8. The device according to claim 1, wherein
the device comprises a circuit board to which said light trap and said light detector are fastened and to which other electronic components of the device are also fastened,
said piece manufactured as one continuous block comprises one or more open regions on its side arranged against the circuit board, and
one or more of said other electronic components are located on the circuit board such that they are arranged at said one or more open regions between said intermediate walls.

9. The device according to claim 1, wherein
said laser source comprises a laser diode and optics located in a common housing, and
said housing is mechanically supported to said piece manufactured as one continuous block.

10. The device according to claim 9, wherein
said housing is shaped as a cylinder having a longitudinal axis,
said laser source is arranged to generate said laser light in such a way that the optical axis of the generated laser light coincides with the longitudinal axis of said cylinder,
said housing is mechanically supported to a cylindrical recess provided as an extension of the light trap in a direction which is opposite in relation to the direction of the target area.

11. A device for measuring the particle content of air, the device comprising:
a laser source for generating laser light and for directing it to a target area,
an air channel for directing the air subjected to the measurement as an air flow through the target area,
a light detector located adjacent to the target area for detecting bursts of light generated as the particles entrained with said air flow scatter said laser light in the target area,
a light trap between said laser source and said target area for reducing stray light propagating to the target area, the light trap comprising at least two intermediate walls which are substantially transverse in relation to the propagation direction of said laser light, each of the intermediate walls having an aperture for passage of a desirably limited amount of the laser light through the given intermediate wall, wherein
said at least two intermediate walls are part of a same piece manufactured as one continuous block, such that each of said apertures is delimited along the full perimeter of the aperture by a continuous portion of said piece manufactured as one continuous block,
said at least two intermediate walls include a first intermediate wall and a second intermediate wall, located in this order from the laser source towards the target area,
the aperture in the first intermediate wall is conical in a cross-section taken along an optical axis of the laser light, such that it is larger from the side of the laser source than from the side of the target area, and
the aperture in the second intermediate wall is conical in a cross-section taken along the optical axis of the laser light, such that it is larger from the side of the target area than from the side of the laser source, and
a third intermediate wall which is arranged between said laser source and said first intermediate wall, and
the aperture in the third intermediate wall is conical in a cross-section taken along the optical axis of the laser light, such that it is larger from the side of the laser source than from the side of the target area.

12. The device according to claim 11, wherein said piece manufactured as one continuous block has been manufactured by injection moulding.

13. The device according to claim 11, wherein said piece manufactured as one continuous block forms a holder for said laser source for holding it in a pre-selected position in relation to said target area.

14. The device according to claim 11, wherein part of said piece manufactured as one continuous block forms a frame surrounding an active area of said light detector.

15. The device according to claim 11, wherein a distance from said laser source to a center of said target area is 10-20 millimeters.

16. The device according to claim 14, wherein
the active area of said light detector is elongated in a direction of the optical axis of the laser light, and
the width of said active area in a direction perpendicular to the optical axis of the laser light is less than 4 millimeters, most preferably less than 2 millimeters.

17. The device according to claim 11, wherein
the device comprises a circuit board to which said light trap and said light detector are fastened and to which other electronic components of the device are also fastened,
said piece manufactured as one continuous block comprises one or more open regions on its side arranged against the circuit board, and
one or more of said other electronic components are located on the circuit board such that they are arranged at said one or more open regions between said intermediate walls.

18. The device according to claim 11, wherein
said laser source comprises a laser diode and optics located in a common housing, and
said common housing is mechanically supported to said piece manufactured as one continuous block.

19. The device according to claim 18, wherein
said common housing is shaped as a cylinder having a longitudinal axis,
said laser source is arranged to generate said laser light in such a way that the optical axis of the generated laser light coincides with the longitudinal axis of said cylinder,
said common housing is mechanically supported to a cylindrical recess provided as an extension of the light trap in a direction which is opposite in relation to the direction of the target area.

* * * * *

UNITED STATES PATENT AND TRADEMARK OFFICE
CERTIFICATE OF CORRECTION

PATENT NO. : 12,313,518 B2
APPLICATION NO. : 17/640103
DATED : May 27, 2025
INVENTOR(S) : Samuli Lintonen et al.

Page 1 of 1

It is certified that error appears in the above-identified patent and that said Letters Patent is hereby corrected as shown below:

In the Claims

In Column 20, Line 17, Claim 1, delete "said target-area" and insert --said air channel--, therefor.

Signed and Sealed this
Fifteenth Day of July, 2025

Coke Morgan Stewart
*Acting Director of the United States Patent and Trademark Office*